US012650940B2

(12) United States Patent
Schmole et al.

(10) Patent No.: US 12,650,940 B2
(45) Date of Patent: Jun. 9, 2026

(54) DEVICE VIRTUALIZATION TECHNIQUES

(71) Applicant: Intel Corporation, Santa Clara, CA (US)

(72) Inventors: Filip Schmole, Portland, OR (US); Ryan Holmqvist, Basking Ridge, NJ (US); Kapil Karkra, Chandler, AZ (US); Orden Smith, Chandler, AZ (US); Nicholas Adams, Beaverton, OR (US); Vinay Raghav, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/985,402

(22) Filed: Nov. 11, 2022

(65) Prior Publication Data

US 2023/0077239 A1      Mar. 9, 2023

(51) Int. Cl.
G06F 13/26          (2006.01)
G06F 13/42          (2006.01)
(52) U.S. Cl.
CPC .......... G06F 13/26 (2013.01); G06F 13/4221 (2013.01); G06F 2213/0024 (2013.01)
(58) Field of Classification Search
CPC ................. G06F 13/26; G06F 13/4221; G06F 2213/0024
See application file for complete search history.

(56) References Cited

U.S. PATENT DOCUMENTS

| | | | | |
|---|---|---|---|---|
| 7,203,801 B1* | 4/2007 | Sharma | ................. | G06F 3/0659 |
| | | | | 711/148 |
| 9,396,147 B1* | 7/2016 | Wieland | ............... | G06F 3/0607 |
| 9,460,040 B2 | 10/2016 | Veal et al. | | |
| 2017/0064042 A1* | 3/2017 | Vora | .................... | H04L 41/0843 |
| 2020/0310997 A1* | 10/2020 | Chen | .................. | G06F 12/1036 |

* cited by examiner

*Primary Examiner* — Zachary K Huson
(74) *Attorney, Agent, or Firm* — Compass IP Law PC

(57)          ABSTRACT

Device virtualization techniques can enable physical I/O devices (such as PCIe devices or other I/O devices) to appear as virtual I/O devices, while also enabling selective exposure of information regarding the physical I/O devices to enable the native drivers of the physical I/O devices to be run. In one example, one or more physical I/O devices associated with a virtual I/O device are locked, and an interface is monitored for requests to those physical I/O devices. The device can be unlocked in response to a request to a predetermined address. When a physical I/O device is locked, read requests to read an identifier of the physical device are blocked, and a value associated with the virtual I/O device is provided. When the physical I/O device is unlocked, read requests to read an identifier of the physical I/O device are forwarded to the physical I/O device.

20 Claims, 8 Drawing Sheets

| 31 | 16 15 | 0 | |
|---|---|---|---|
| Device ID | Vendor ID | | 00h |
| Status | Command | | 04h |
| Class Code | | Revision ID | 08h |
| BIST | Header Type | Lat. Timer | Cache Line S. | 0Ch |

300 determine that one or more physical I/O devices are associated with a virtual I/O device 301 lock/hide one or more physical I/O devices associated with a virtual I/O device 302 monitor an interface for requests to the physical I/O device(s) associated with the virtual I/O device 304 in response to a request to unlock/expose one of the physical I/O devices (e.g., a request to write an special key to a read-only register), unlock/expose the physical I/O device 306 in response to a request to lock/hide one of the physical I/O devices (e.g., a request to write the special key to a read-only register), re-lock/re-hide the physical I/O device 307 detect a request to read an identifier (e.g., vendor ID or device ID) of the physical I/O device 308 in response to the request to read the identifier when the physical I/O device is in a locked/hidden state, intercept the request and respond to the request with a value for the virtual I/O device 310 in response to the request to read the identifier when the physical I/O device is in an unlocked/exposed state, forward the request to read the identifier to the physical I/O device 312

DEVICE VIRTUALIZATION TECHNIQUES

FIELD

Descriptions are generally related to virtualization techniques for devices such as PCIe devices or other devices configured to couple with an I/O fabric.

BACKGROUND

A computer system includes the host hardware components, such as the central processor and interconnection hardware. The host hardware components execute a host operating system that manages the computer system. The computer system can include one or more Peripheral Component Interconnect Express (PCIe) devices coupled with the host, such as storage devices (e.g., SSDs), network interface cards (NICs), graphics cards, and/or other PCIe devices.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" or examples are to be understood as describing a particular feature, structure, and/or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

FIGS. 3, 4A and 4B are flow charts illustrating examples of methods of virtualizing I/O devices.

Descriptions of certain details and implementations follow, including a description of the figures, which may depict some or all of the embodiments described below, as well as discussing other potential embodiments or implementations of the inventive concepts presented herein.

DETAILED DESCRIPTION

Techniques described herein can enable physical I/O devices (such as PCIe devices or other I/O devices) to appear as virtual I/O devices (e.g., identical virtual I/O devices) that can be aggregated, while also enabling selective exposure of information regarding the physical I/O devices to enable the native drivers of the physical I/O devices to be run.

Figure 1:
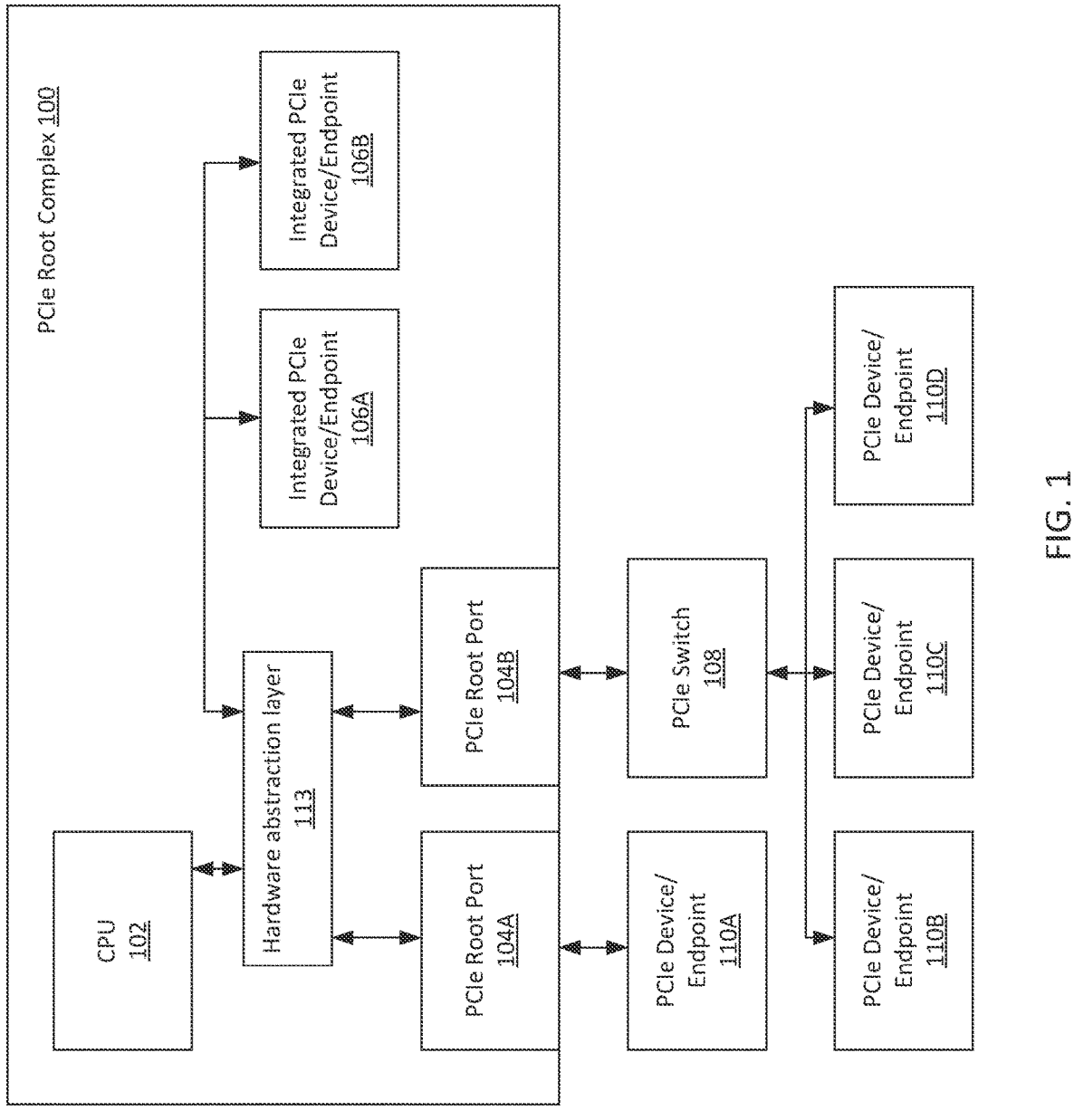
FIG. 1 illustrates an example of a PCIe root complex.

FIG. 1 illustrates an example of a PCIe root complex 100. The root complex 100 refers to the root of an input/output (I/O) hierarchy that couples a central processing unit (CPU)

102 and a memory subsystem (not shown) to the I/O. See, e.g., page 103 of the PCI Express Base Specification Revision 6.0, Dec. 16, 2021.

The root complex 100 can support one or more PCIe root ports 104A, 104B and each root port can include a single endpoint or a sub-hierarchy that includes one or more PCIe switches coupled with one or more PCIe endpoints. A root port is a port on the root complex 100. An endpoint refers to a device that resides at the end or bottom of a hierarchy or sub-hierarchy. For example, the PCIe root port 104A is coupled with the PCIe device 110A, which is also a PCIe endpoint. The PCIe root port 104B includes or is coupled with a PCIe switch 108, which is coupled with multiple PCIe devices 110B, 110C, and 110D. The PCIe devices 110B, 110C, and 110D are also endpoints. The root complex 100 can also include integrated PCIe devices or endpoints 106A, 106B.

Some systems include a hardware device that adds a layer of abstraction between the CPU and the PCIe devices. A hardware abstraction layer 113 can enable hiding a portion of the PCIe hierarchy and exposing it through a dedicated, root-complex integrated PCIe endpoint. By using a hardware abstraction layer, multiple PCIe devices can be aggregated and represented as one device. However, such hardware abstraction layers add hardware complexity, which increases the potential for bugs and increases verification efforts. Additionally, existing hardware abstraction layers rely on requester ID replacement, resulting in a loss of source information. For example, direct memory access (DMA) requests and interrupts from devices assigned to the hardware abstraction layer appear as if they are coming from the hardware abstraction layer itself rather than the original device. The loss of the original requester ID impacts the ability to support features such as: address translation services (ATS) because invalidations cannot be sent to the source, routing of MCTP messages that involve lookup of the MCTP endpoint ID and remapping to the true requester ID, routing of completions that would require storing original source information in hardware, and direct-assign to a guest virtual machine (VM), which would require exposing the physical address mapping, creating a security risk.

In contrast, abstraction and aggregation of I/O devices can be achieved with techniques to represent one or more physical I/O devices as virtual I/O devices while also selectively exposing the physical I/O devices to enable running the native drivers for the physical I/O devices. Physical I/O devices can include, for example, PCIe devices, compute express link (CXL) devices, or other hardware devices connected to, or configured to connect to, an I/O fabric or bus. Physical I/O devices may include an actual physical device that can be added or plugged into the system, an integrated physical device, or an aspect of function of a physical device that is defined by firmware or software (e.g., functionality that is a part of, and integrated into, a physical processor or other physical device). PCIe device is an example of an I/O device designed or configured to connect to a PCIe fabric in accordance with existing or future versions of the PCIe standard. Aggregating multiple I/O devices can provide enhanced capabilities and performance. For example, grouping multiple Nonvolatile Memory Express® (NVMe®) devices with RAID can enable redundancy, reliability, larger capacities, and improved performance. Enabling the native driver for the physical I/O devices to be run eliminates the need to write new drivers, which may be prohibitively difficult and time-consuming.

Figure 2A:
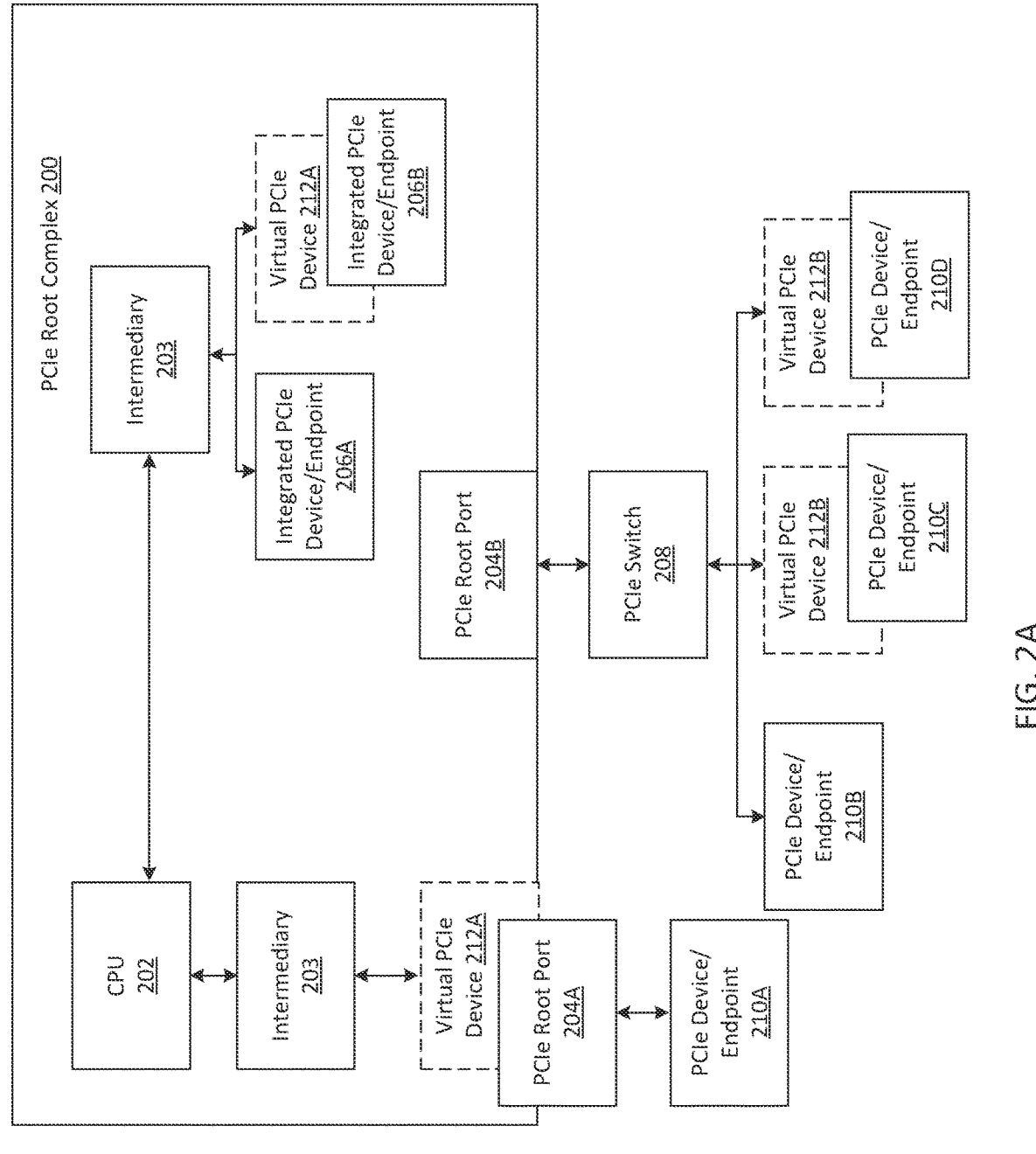
FIG. 2A illustrates an example of a PCIe root complex including logic to implement input/output (I/O) device virtualization techniques.

FIG. 2A illustrates an example of a PCIe root complex 200 including logic to implement input/output (I/O) device virtualization techniques. The PCIe root complex 200 includes a CPU 202 coupled with physical PCIe devices 210A, 210B, 210C, 210D, 206A, and 206B. Examples of PCIe devices include storage devices (e.g., SSDs), network interface cards (NICs), graphics cards, accelerators, or other devices. Some devices are coupled with the CPU 202 via a root port (e.g., the PCIe root ports 204A, 204B) and some are integrated endpoints (e.g., PCIe devices 206A and 206B). The devices 210B, 210C, and 210D are further coupled with the root port 204B via a PCIe switch 208. Other sub-hierarchies may include multiple levels of switches.

Figure 2B:
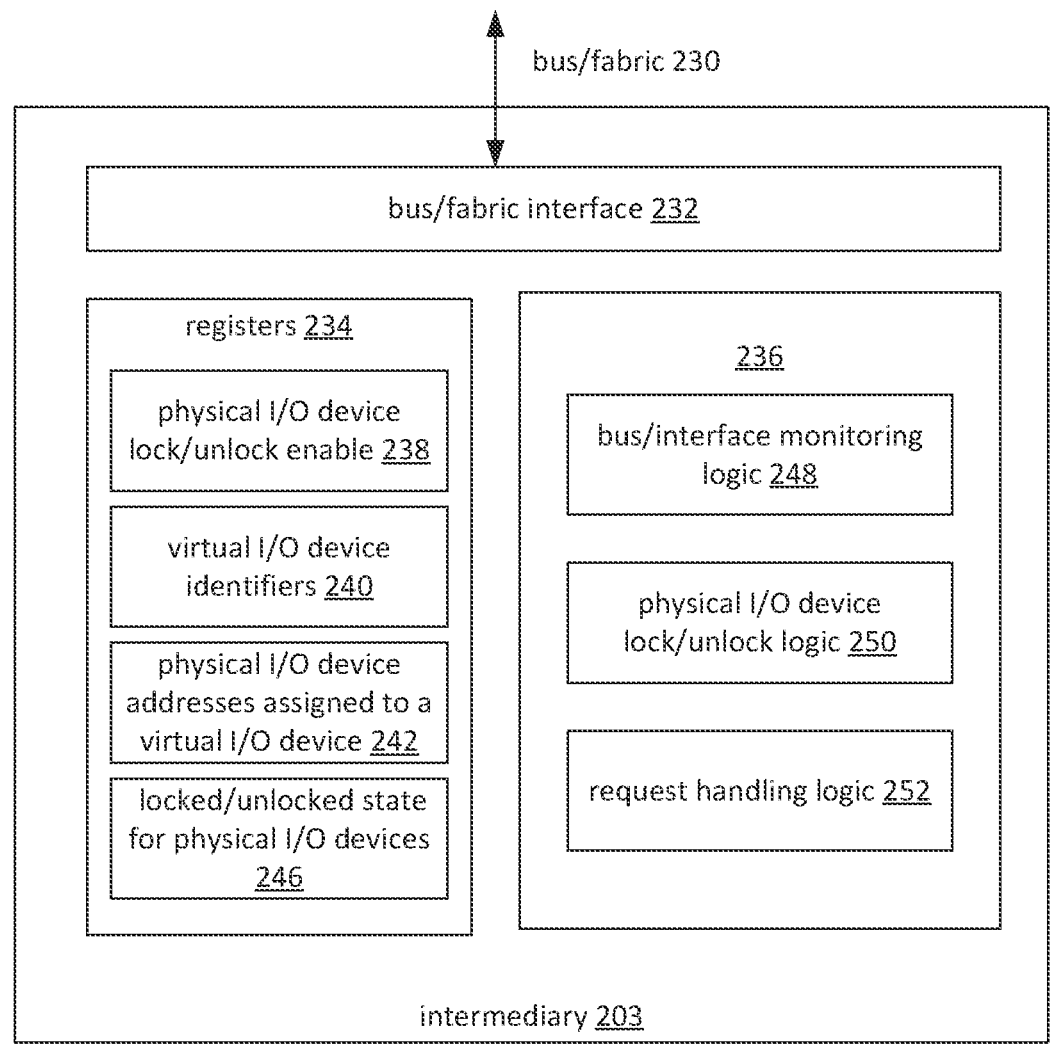
FIG. 2B illustrates a block diagram of an example of an intermediary.

The example in FIG. 2A includes an intermediary 203 between the CPU 202 and physical PCIe devices. The intermediary can be implemented in hardware, in firmware, or a combination of hardware and firmware (e.g., a microcontroller with firmware). For ease of reference, the term intermediary is used throughout this description, however, other terms may be used, such as logic, hardware logic, module, device virtualization logic, or other similar terms. FIG. 2B illustrates a block diagram of an example of the intermediary 203. The intermediary 203 includes logic 236 to enable I/O device virtualization, including bus/interface monitoring logic 248, logic 250 to lock or unlock physical I/O devices, and logic 252 to handle requests to physical I/O devices associated with a virtual I/O device. The intermediary also includes one or more registers 234. The registers 238, 240, 242, and 246 can be different registers or different fields or ranges of the same register(s). In one example, the one or more registers 234 store information that enables the intermediary to lock or unlock physical I/O devices and selectively intercept requests to those I/O devices.

The intermediary 203 includes an interface (e.g., bus or fabric interface) 232 to couple to a bus, buses, or fabric that couple a requester (e.g., the CPU 202 or other processing device) with one or more physical PCIe devices (e.g., the physical PCIe devices 210A, 210B, 210C, 210D, 206A, and 206B). In one example, the fabric connecting the CPU 202 and root ports 204A, 204B, and between the CPU 202 and the integrated devices 206A, 206B can be referred to as a host bus or system fabric. The fabric 230 can represent one or more mesh connections, a central switching mechanism, a ring connection, a hierarchy of fabrics, or other interconnection topology to enable the exchange of data signals between components of the system, such as the CPU 202 and the physical PCIe devices 210A, 210B, 210C, 210D, 206A, and 206B.

Referring again to FIG. 2A, some of the physical PCIe devices of FIG. 2A are "morphed into" or associated with a virtual PCIe device. For example, the physical PCIe devices 210A and 206B are associated with the virtual PCIe device 212A, and the physical PCIe devices 210C and 210D are associated with the virtual PCIe device 212B. Thus, the physical PCIe device 210A and the physical PCIe device 206B appear as two identical virtual PCIe devices 212A. Similarly, the physical PCIe devices 210C and 210B appear as two identical virtual PCIe devices 212B.

The physical PCIe devices that are to appear as the same type of virtual PCIe device can be the same type of physical devices or different types of physical devices. For example, the PCIe device 210A can be a NIC and the integrated PCIe device 206B can be an integrated accelerator, where both the NIC and accelerator are to appear as the same type of virtual PCIe device 212A. In another example, multiple storage devices (e.g., multiple NVMe® SSDs) or multiple NICs can be associated with the same virtual PCIe device. For example, the PCIe devices 210C, 210D may be the same type of device and both appear as instances or copies of the same virtual PCIe device 212B. Even if the physical PCIe devices morphed into a virtual PCIe device are the same type of device, the physical devices can have the same or different attributes or be from the same or different vendors. For example, multiple SSDs associated with the same virtual PCIe device can be from different vendors and have different capacities and/or speeds. Thus, rather than multiple physical devices hidden behind one virtual device, in one example, each of the multiple physical devices appear to the OS as multiple virtual devices of the same type.

Figures 2C, 2D:
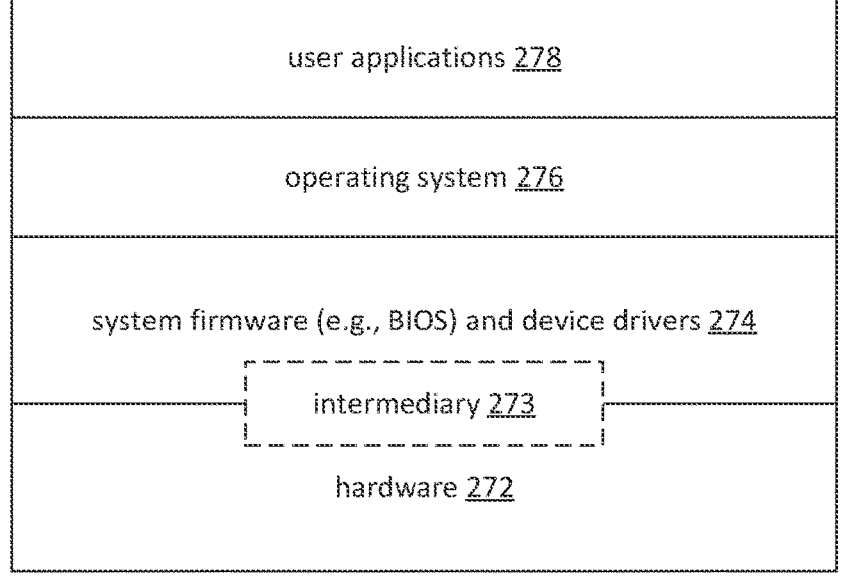
FIG. 2C illustrates an example of registers defined in PCIe configuration space.
FIG. 2D illustrates an example of hardware and software stack of a system.

FIG. 2D illustrates an example of a software and hardware stack including an intermediary. The hardware 272 includes the hardware logic and/or circuitry of a system, including, for example, the CPU 202 and PCIe devices 210A-210D and 206A-206B, and the PCIe switch 208. Other hardware components may also be included, such as one or more components of the platform 500 of FIG. 5, described below. Some or all of the functionality of the intermediary 273 may be implemented in hardware 272. System firmware (such as a BIOS or other system firmware) and device drivers 274 configure, control, and/or enable access to the underlying hardware 272. Some or all of the functionality of the intermediary 273 may be implemented in firmware. An operating system 276 can be loaded by system firmware, which accesses the hardware 272 via the device drivers 274. User applications 278 that are run by the operating system 276 utilize the hardware 272 via the operating system 276 and/or device drivers 274.

Figure 4A:
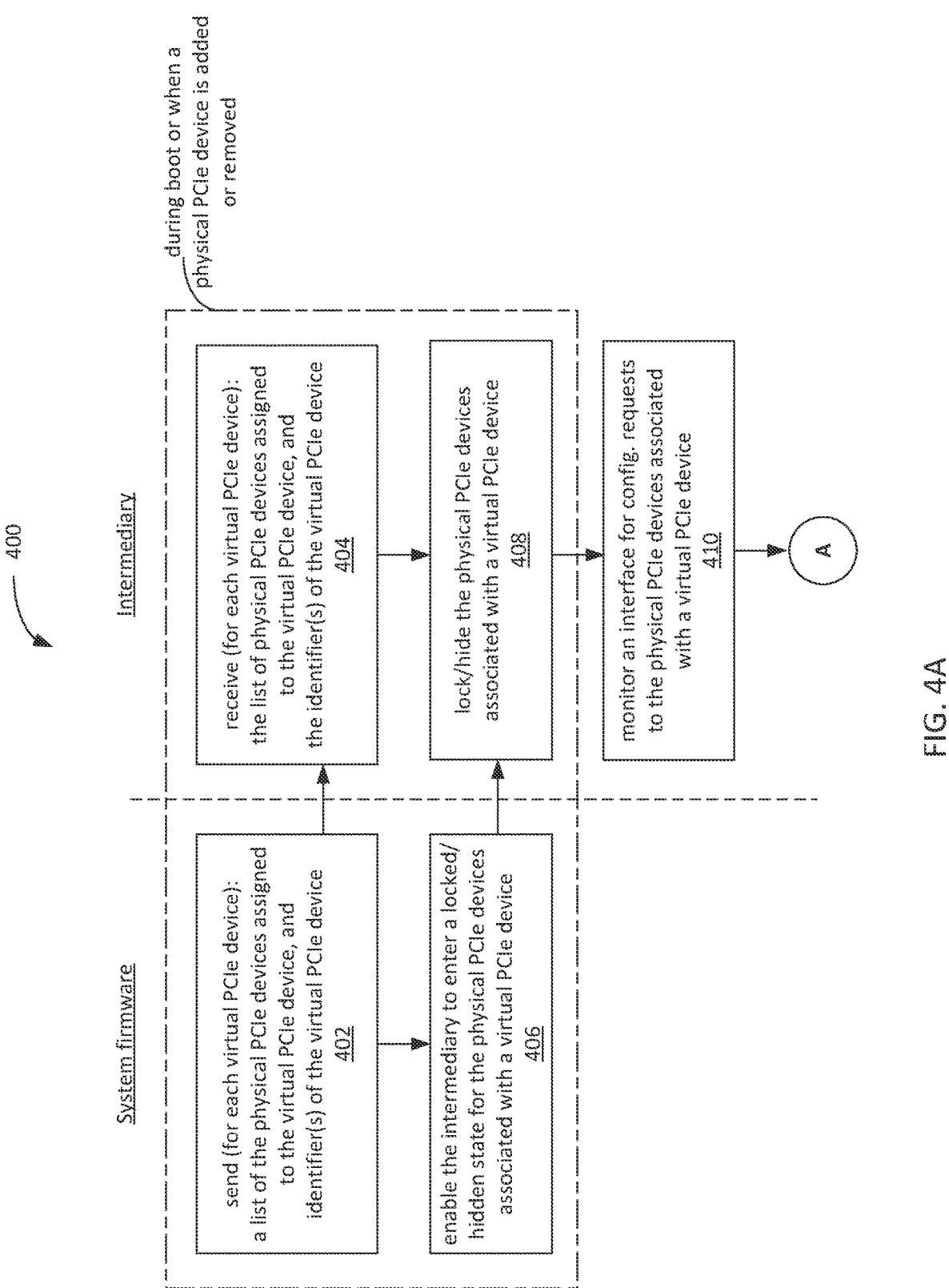
Figure 4B:
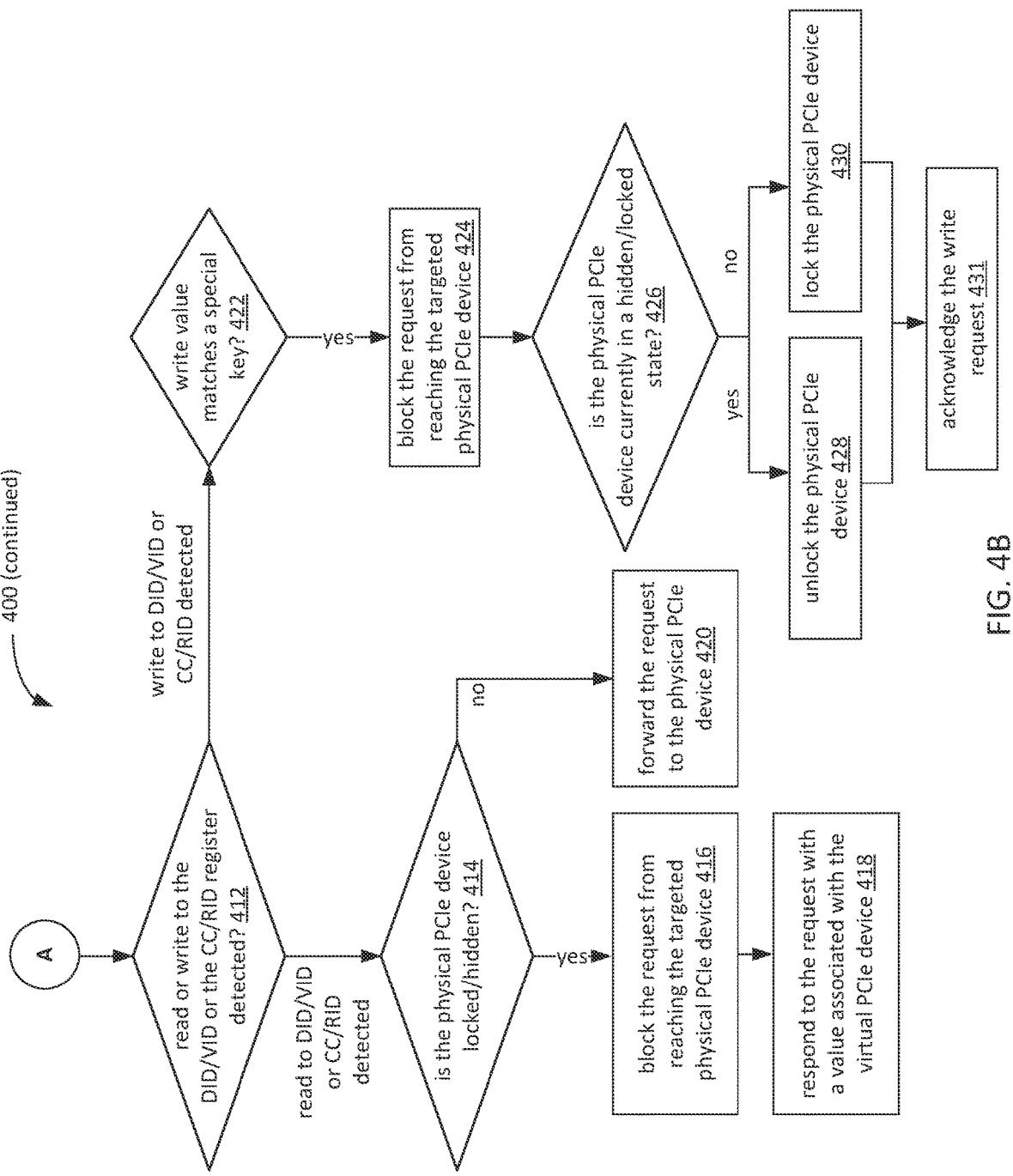

As mentioned above, virtualization of I/O devices can be achieved by selectively hiding the physical I/O devices to enable those devices to appear as virtual devices and exposing the physical I/O devices to enable loading the drivers of the physical I/O devices. FIGS. 3, 4A, and 4B are flow charts illustrating examples of methods of virtualizing I/O devices. FIGS. 3, 4A, and 4B illustrate methods that can be performed by hardware, firmware, or a combination of hardware and firmware, such as the intermediary 203 of FIGS. 2A and 2B. The examples in FIGS. 3, 4A, and 4B will be described with reference to FIGS. 2A and 2B.

Referring first to FIG. 3, the method 300 involves determining that one or more physical I/O devices are associated with a virtual I/O device, at block 301. Determining that a physical I/O device is associated with a virtual I/O device may involve, for example, receiving, reading, or otherwise accessing information regarding which physical I/O devices are assigned to or morphed into a virtual I/O device. For example, referring to FIG. 2B, the physical I/O device addresses that are assigned to a virtual I/O device are stored in a register 242.

The method 300 involves locking or hiding physical I/O devices that are associated with a virtual I/O device, at block 302. Note that locking and hiding a physical PCIe device are referred to interchangeably in the following description. In one example, locking a physical I/O device can be triggered during boot or during the addition of the physical I/O device during runtime (e.g., in response to a hot plug event). Locking or hiding a physical I/O device may involve storing a value in a register (e.g., setting one or more bits in one or more registers) or otherwise asserting a signal to indicate that the physical I/O device is in a locked or hidden state. For example, referring to FIG. 2B, logic 250 locks a physical I/O device by storing a value in the register 246 to indicate that the physical I/O device is in a locked state.

Referring again to FIG. 3, the method 300 further involves monitoring an interface or bus for requests to the physical I/O device(s) associated with the virtual I/O device, at block 304. For example, referring to FIG. 2B, bus/interface monitoring logic 248 monitors interface 232 for requests or commands from a requester (such as a processor or other requesting device) to addresses of the physical I/O device(s) associated with a virtual I/O device. In one example in which the physical I/O device is a PCIe device, requests to the PCIe device can be detected based on the requester ID of the PCIe device. In the example illustrated in FIG. 2B, the intermediary includes one or more registers 242 to store address information (such as requester IDs or other address information) for physical I/O devices associated with a virtual I/O device. The addresses of requests detected at the interface 232 can then be compared to the physical I/O device addresses stored in the register 242 to identify which requests target the physical I/O devices associated with the virtual I/O device.

Referring again to FIG. 3, when a request to unlock or expose one of the physical I/O devices is detected, at block 306, the method 300 involves unlocking or exposing the physical I/O device. A request to unlock or expose a physical I/O device can involve, for example, a request to write a value to a particular address (e.g., a read-only register of the physical I/O device or another special address to unlock the device), or a read request to a pre-determined address, such as a non-existent or undefined register offset. In one example, the value to write is a special key to either trigger unlocking or trigger toggling between an unlock and lock state. In one example, the value is based on an identifier of the virtual device (e.g., the inverse of an identifier, such as the inverse of DID/VID or CC/RID) and/or stored in a register or based on a value stored in a register of the intermediary (e.g., the register 240 or other register). In one example, the request to trigger unlocking the physical I/O device is one request in an unlock sequence.

Regardless of whether a special pre-determined address and/or special pre-determined key is used to trigger unlocking the device, the physical I/O device is placed in an unlocked state in response to the request to unlock the device. Unlocking or exposing a physical I/O device may involve storing a value in a register (e.g., setting one or more bits in one or more registers) or otherwise asserting a signal to indicate that the physical I/O device is in an unlocked or exposed state. For example, referring to FIG. 2B, logic 250 unlocks a physical I/O device by storing a value in the register 246 to indicate that the physical I/O device is in an unlocked state.

Referring again to FIG. 3, when a request to lock one of the physical I/O devices is detected, the method 300 involves re-locking or re-hiding the physical I/O device, at block 307. Re-locking a physical I/O device can involve the same or similar techniques as the initial locking described with reference to block 302 of FIG. 3 (e.g., setting the register 246 of FIG. 2B or other signal to indicate the device is locked). In one example, the same type of request to the same pre-determined address can be used to toggle between locking and unlocking a device. For example, detection of a request to write the same value to the same read-only register can trigger toggling between locking and unlocking a device. In another example, the request to trigger re-locking a physical I/O device can be a different type of request, to a different address, and/or write a different value. In one example, referring to FIG. 2B, the logic 250 locks the physical I/O device in response to detection of the request to lock the device.

Referring to FIG. 3, the method 300 involves detecting a request to read an identifier of the physical I/O device, at block 308. For example, referring to FIG. 2B, the logic 248 detects a read request to a configuration register to read an identifier such as device ID (DID), vendor ID (VID), class code (CC), revision ID (RID) or other identifiers of the physical I/O device. FIG. 2C illustrates an example of the DID/VID and CC/RID registers defined in PCIe configuration space. In response to the request to read the identifier when the physical I/O device is in a locked state, the request is intercepted (e.g., blocked) and the intermediary responds to the request with a value for the identifier associated with the virtual I/O device, at block 310. In response to the request to read the identifier when the physical I/O device is in an unlocked state, the request is forwarded to the physical I/O device, at block 312. The physical I/O device can then respond with the actual value for the identifier of the physical device.

For example, referring to FIG. 2B, when a request to read an identifier is requested, the logic 252 determines how to handle the request based on whether the physical I/O device is in a locked or unlocked state. If the physical I/O device is in a locked state, the logic 252 responds to the request with the value of the identifier for the virtual I/O device. If the physical I/O device is in an unlocked state, the logic 252 allows the request to continue (e.g., by forwarding or not blocking the request) to the physical I/O device. Thus, in one example, when the I/O device is a PCIe device that is locked or hidden, access is disabled to identifying information of the physical PCIe device, such as DID/VID and CC/RID or other identifiers of the physical PCIe device. Instead of providing the actual identifiers for the physical PCIe device, the intermediary provides values of the identifiers for the virtual PCIe device, causing the physical PCIe device to appear as the virtual PCIe device to the OS. When the PCIe device is unlocked or exposed, access is enabled to the identifiers of the physical PCIe device.

FIGS. 4A and 4B illustrate an example of a method of virtualizing PCIe devices. In one example, during boot of a system, a process referred to as enumeration is performed by the system firmware (e.g., by the BIOS). PCIe enumeration involves discovery of the PCIe devices in the system, and assignment of resources to those devices. The assignment of resources includes, for example, address space and interrupt vectors. After enumeration (but typically before the operating system (OS) has been loaded), system firmware can determine which of the physical PCIe devices will be morphed into virtual PCIe devices. For example, after system firmware performs a full enumeration of all PCIe hierarchies, system firmware assigns a subset of physical PCIe devices to a virtual PCIe device. The determination of which physical PCIe devices are assigned to a virtual device can be based on, for example, customer-visible configuration knobs (e.g., BIOS settings or other configurable settings).

In one example, after system firmware has enumerated the PCIe hierarchy but prior to loading the operating system, system firmware informs the intermediary of information to enable the intermediary to intercept certain requests targeting the physical PCIe devices that are to be represented as virtual PCIe devices. For example, the method 400 begins with system firmware sending, for each virtual PCIe device, a list of physical PCIe devices to be represented as an instance of the virtual PCIe device, and one or more identifiers of the virtual PCIe device, at block 402. Identifiers of the PCIe device may include, for example, the intended DID, VID, CC, and RID of the virtual PCIe device, header type, and/or other identifying information. The intermediary receives, for each virtual PCIe device, the list of physical PCIe devices, and the identifiers for the virtual PCIe device, at block 404. For example, referring to FIG. 2B, system firmware can write the list of physical PCIe devices and identifiers for the virtual PCIe devices(s) to registers or other storage of the intermediary 203. In one such example, the DID, VID, CC, RID, header type, and/or other identifiers can be stored in the register 240 and the addresses for the physical PCIe devices can be stored in the register 242. In one such example, the intermediary 203 includes a mailbox that system firmware writes to in order to communicate which physical PCIe device(s) are to be appear as which virtual PCIe device.

Referring again to FIG. 4A, the system firmware then enables the intermediary to enter a locked state for the physical PCIe devices associated with a virtual PCIe device, at block 406. In one example, referring to FIG. 2B, enabling the intermediary to enter a locked state can involve setting one or more enable bits in a register of the intermediary, such as the register 238. In other examples, the locking feature is enabled by default and/or triggered as another part of the boot process. In the example of FIG. 4A, the intermediary then locks or hides the physical PCIe devices associated with a virtual PCIe device, at block 408. In one example, referring to FIG. 2B, locking a device involves setting one or more bits in a register 246 to indicate that the physical PCIe device is in a locked state (e.g., by logic 250). In one example, after enabling locking of the physical PCIe devices, the system firmware loads the operating system.

Referring again to FIG. 4A, the intermediary monitors the interface or bus for configuration requests to the physical PCIe devices associated with a virtual PCIe device, at block 410. In one example, monitoring the interface for configuration requests to a physical PCIe device involves detecting configuration requests at the interface with an address (e.g., requester ID) assigned to configuration space for those physical PCIe devices. In one such example, referring to FIG. 2B, bus/interface monitoring logic 248 monitors the interface 232 for requests to the addresses stored in the register 242.

The method 400 continues in FIG. 4B. If a read to the DID/VID or CC/RID registers of a physical PCIe device associated with a virtual PCIe device is detected at block 412, the intermediary determines whether the physical PCIe device is locked or unlocked, at block 414. Determining whether a physical PCIe device is locked can involve, for example, checking the state of the device (e.g., by reading one or more bits in the register 246 that indicate whether the device is locked). If the physical PCIe device is not locked, the intermediary forwards the request to (or otherwise allows the request to reach) the physical PCIe device, at block 420. If the physical PCIe device is locked, the request is blocked from reaching the targeted physical PCIe device, at block 416. For example, referring to FIG. 2B, request handling logic 252 blocks the request from reaching the physical PCIe device. The intermediary can then respond to the request with a value associated with the virtual PCIe device, at block 418. For example, the request handling logic 252 of the intermediary 203 can respond with the virtual PCIe device's identifier stored in the register 240. For example, if the intercepted request is a read request to the DID/VID register, the intermediary blocks the request and supplies the DID/VID of the virtual PCIe device to which the physical PCIe device is assigned. In one example, responding to the request with a value associated with the virtual PCIe device causes system software (e.g., the OS) to load the driver for the virtual PCIe device instead of the physical PCIe device. Thus, in one example, for physical PCIe devices in the list (e.g., physical PCIe devices assigned to a virtual PCIe device) the operating system reads a substituted DID, VID, CC and RID and hence loads the driver for the virtual device instead of the underlying devices.

Referring again to block 412 of FIG. 4B, if a write to the DID/VID or CC/RID (or other read-only register of the physical PCIe devices associated with a virtual PCIe device) is detected, the intermediary checks to see if the write value matches a key, at block 422. The key can be any value used to trigger unlocking/locking the physical PCIe device. In one example, the key is based on an identifier of the virtual device, such as the inverse of the identifier of the virtual PCIe device. For example, the key can be the inverse of the DID/VID of the virtual PCIe device, or the inverse of the CC/RID of the virtual PCIe device. In one example, the key is stored in a register of the intermediary or based on a value stored in a register (e.g., based on the DID/VID of a virtual PCIe device stored in the register 240 of FIG. 2B).

Referring again to FIG. 4B, if the write value matches a key, the intermediary (e.g., request handling logic 252 of the intermediary 203) blocks the request from reaching the targeted physical PCIe device, at block 424. The intermediary can then toggle locking or unlocking the physical PCIe device. For example, if the physical PCIe device is locked, then the intermediary unlocks the device in response to the write request to write the key, at block 428. In one example, unlocking the device enables a subsequent read request to the DID/VID or CC/RID to reach the physical PCIe device, enabling system software to discover the true DID/VID and CC/RID. For example, the driver for the virtual PCIe device can write the key to unlock the physical PCIe device and read the actual DID/VID or other identifier and instantiate the native driver for the underlying device. After unlocking the physical PCIe device, the intermediary acknowledges the write request (e.g., by sending an acknowledgement back to the requester), at block 431. Sending the acknowledgement only after the physical PCIe device has been placed in an unlocked state can ensure that the subsequent read request to read an identifier of that physical PCIe device will be forwarded to the physical PCIe device.

Referring again to block 426 of FIG. 4B, if the physical PCIe device is in an unlocked state, the intermediary re-locks the physical PCIe device, at block 430. In one example, locking the physical PCIe device enables blocking and special handling of a subsequent read request to DID/VID or CC/RID (e.g., responding to the request with a value for the virtual PCIe device at block 418). After locking the physical PCIe device, the intermediary acknowledges the write request (e.g., by sending an acknowledgement back to the requester), at block 431. Sending the acknowledgement only after the physical PCIe device has been placed in a locked state (as opposed to prior to block 430) can ensure that the intermediary will respond to a subsequent read request to read an identifier of the physical PCIe device with a value for the virtual PCIe device.

Thus, upon detecting a second write to the read-only register with the key (such as the inverse of the substituted value or other key), the intermediary reverts to blocking the read requests and returning the substituted values for DID, VID, CC and RID. Similarly, in one example, on a reboot or when the intermediary observes the device being reset, the intermediary also reverts to locking the device to intercept certain read requests. Although the example in FIG. 4B illustrates toggling between a locked and unlocked state in response to the write to the read-only register with the special key, in other examples, different requests, address, and/or values can be used to lock and unlock a physical PCIe device.

Thus, in one example, the method 400 enables the intermediary to selectively intercept accesses to two registers in the base PCIe configuration header of the devices in the group: the Device ID/Vendor ID (DID/VID) register located at offset 0, and the Class Code/Revision ID (CC/RID) register located at offset 8. However, read requests to read other identifying information of the PCIe device can also be intercepted. This technique enables morphing OS-discoverable devices into virtual devices. In other words, the technique enables the physical PCIe devices that were selected to be morphed into virtual devices to appear to system software as identical virtual devices belonging to a group. For example, by virtue of returning identical DID/VID values for physical PCIe devices associated with a virtual PCIe device, the technique enables software to be informed that the devices are part of a group. In one example, software can then perform aggregation of devices.

If it is desirable to follow the same aggregation model as in the legacy Volume Management Device (VIVID), then one approach is to morph the appearance of only the root port to which the SSDs are connected. This affords an opportunity to load the VMD driver, which would then load additional software to manage this portion of the PCIe hierarchy. In order to force the OS to allocate resources for the devices in this portion of the PCIe hierarchy, system firmware can create ACPI devices as part of the VMD enumeration during early boot. In one example, if system firmware assigns a root port to the VMD, it is not necessary to assign the devices downstream of that root port because the VMD driver already has a hook to the entire PCIe subhierarchy. If system firmware assigns only some of the devices below a root port to the VMD, but not all of them, then it is possible for system software to perform rebalancing and re-assign new bus numbers to the devices. In one such example, the intermediary detects this and dynamically updates the list of devices for which DID/VID should be substituted. System firmware can optionally prevent rebalancing by creating ACPI host bridges for root ports and root-complex integrated endpoints. Also note that in one example, peer-to-peer requests, in-band PECI requests, or requests from a Baseband Management Controller (BMC) can optionally bypass the DID/VID remapping in the intermediary, if it is desirable for debug or management of the true physical devices.

Note that although the method 400 of FIGS. 4A and 4B refers to PCIe devices, the techniques described may apply to other devices coupled with an I/O fabric. Also note that while some examples refer to specific registers or identifiers, the techniques can apply to enable selectively intercepting other reads of identifying information of a device.

Figure 5:
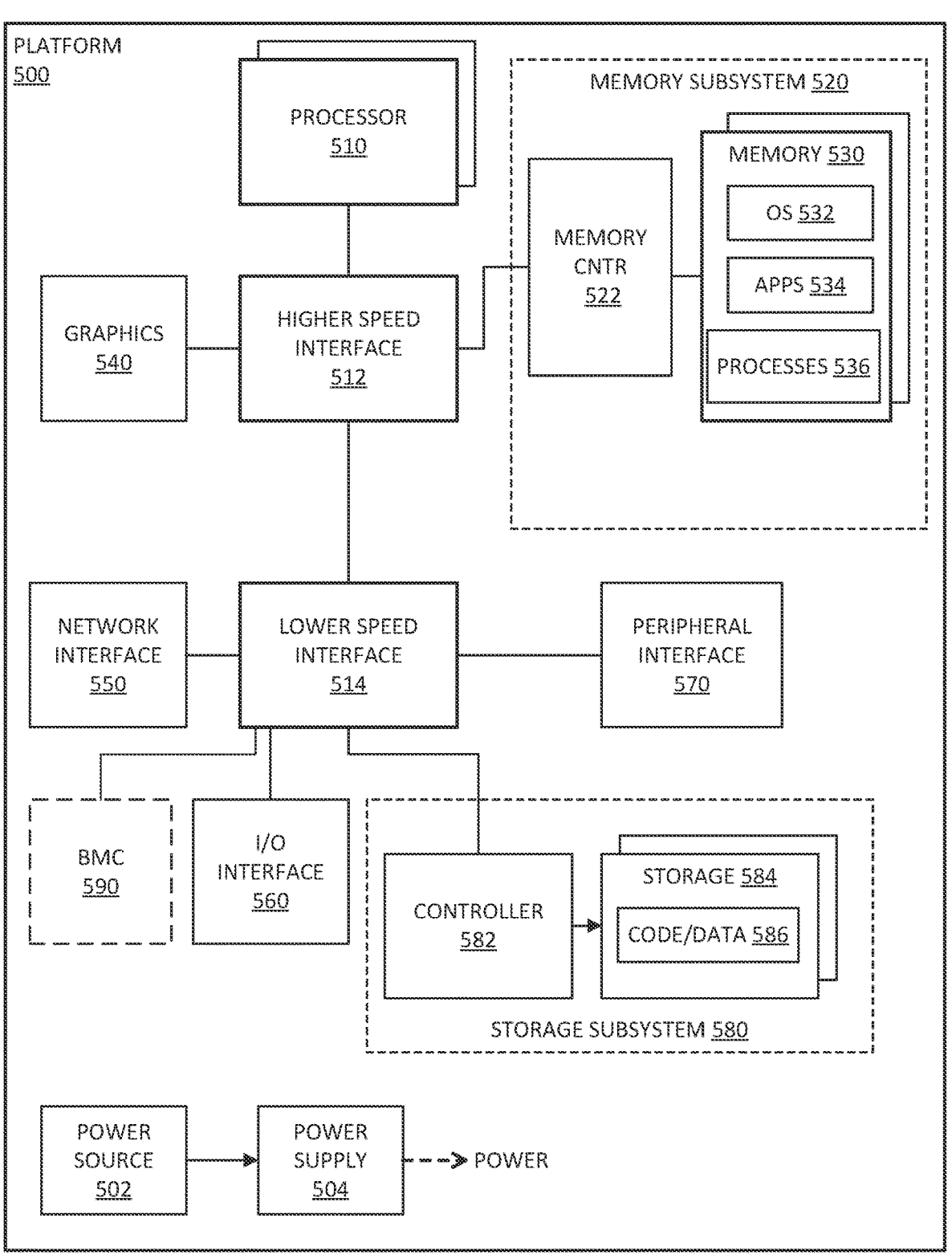
FIG. 5 illustrates a block diagram of an exemplary compute platform in which embodiments described and illustrated herein may be implemented.

FIG. 5 illustrates a block diagram of an exemplary compute platform in which embodiments described and illustrated herein may be implemented. Compute platform 500 represents a computing device or computing system in accordance with any example described herein, and can be a server, laptop computer, desktop computer, or the like.

Compute platform 500 includes a processor 510, which provides processing, operation management, and execution of instructions for compute platform 500. Processor 510 can include any type of microprocessor, CPU, graphics processing unit (GPU), infrastructure processing unit (IPU), processing core, or other processing hardware to provide processing for compute platform 500, or a combination of processors. Processor 510 may also comprise an SoC or XPU. Processor 510 controls the overall operation of compute platform 500, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, compute platform 500 includes interface 512 coupled to processor 510, which can represent a higher speed interface or a high throughput interface for system components that needs higher bandwidth connections, such as memory subsystem 520 or graphics interface components 540. Interface 512 represents an interface circuit, which can be a standalone component or integrated onto a processor die. Where present, graphics interface 540 interfaces to graphics components for providing a visual display to a user of compute platform 500. In one example, graphics interface 540 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touch-screen display. In one example, graphics interface 540 generates a display based on data stored in memory 530 or based on operations executed by processor 510 or both.

Memory subsystem 520 represents the main memory of compute platform 500 and provides storage for code to be executed by processor 510, or data values to be used in executing a routine. Memory 530 of memory subsystem 520 may include one or more memory devices such as DRAM devices, read-only memory (ROM), flash memory, or other memory devices, or a combination of such devices. Memory 530 stores and hosts, among other things, operating system (OS) 532 to provide a software platform for execution of instructions in compute platform 500. Additionally, applications 534 can execute on the software platform of OS 532 from memory 530. Applications 534 represent programs that have their own operational logic to perform execution of one or more functions. Processes 536 represent agents or routines that provide auxiliary functions to OS 532 or one or more applications 534 or a combination. OS 532, applications 534, and processes 536 provide software logic to provide functions for compute platform 500. In one example, memory subsystem 520 includes memory controller 522, which is a memory controller to generate and issue commands to memory 530. It will be understood that memory controller 522 could be a physical part of processor 510 or a physical part of interface 512. For example, memory controller 522 can be an integrated memory controller, integrated onto a circuit with processor 510. The memory 530 and memory controller 522 can be in accordance with standards such as: DDR4 (Double Data Rate version 4, initial specification published in September 2012 by JEDEC (Joint Electronic Device Engineering Council). DDR4E (DDR version 4), LPDDR3 (Low Power DDR version 3, JESD209-3B, August 2013 by JEDEC), LPDDR4 (LPDDR version 4, JESD209-4, originally published by JEDEC in August 2014), WIO2 (Wide Input/Output version 2, JESD229-2 originally published by JEDEC in August 2014, HBM (High Bandwidth Memory, JESD325, originally published by JEDEC in October 2013), DDR5 (DDR version 5, JESD79-5A, published October, 2021), DDR version 6 (DDR6) (currently under draft development), LPDDR5, HBM2E, HBM3, and HBM-PIM, or others or combinations of memory technologies, and technologies based on derivatives or extensions of such specifications. The specification for LPDDR6 is currently under development. The JEDEC standards are available at www.jedec.org.

While not specifically illustrated, it will be understood that compute platform 500 can include one or more links, fabrics, buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses or other interconnections can include, for example, one or more of a system bus, a Peripheral Component Interconnect (PCI) bus, a HyperTransport or industry standard architecture (ISA) bus, a small computer system interface (SCSI) bus, a universal serial bus (USB), PCIe link, or an Institute of Electrical and Electronics Engineers (IEEE) standard 1394 bus.

In one example, compute platform 500 includes interface 514, which can be coupled to interface 512. Interface 514 can be a lower speed interface than interface 512. In one example, interface 514 represents an interface circuit, which can include standalone components and integrated circuitry. In one example, multiple user interface components or peripheral components, or both, couple to interface 514. Network interface 550 provides compute platform 500 the ability to communicate with remote devices (e.g., servers or other computing devices) over one or more networks. Network interface 550 can include an Ethernet adapter, wireless interconnection components, cellular network interconnection components, USB (universal serial bus), or other wired or wireless standards-based or proprietary interfaces. Network interface 550 can exchange data with a remote device, which can include sending data stored in memory or receiving data to be stored in memory.

In one example, compute platform 500 includes one or more I/O interface(s) 560. I/O interface(s) 560 can include one or more interface components through which a user interacts with compute platform 500 (e.g., audio, alphanumeric, tactile/touch, or other interfacing). Peripheral interface 570 can include any hardware interface not specifically mentioned above. Peripherals refer generally to devices that connect dependently to compute platform 500. A dependent connection is one where compute platform 500 provides the software platform or hardware platform or both on which operation executes, and with which a user interacts.

In one example, compute platform 500 includes storage subsystem 580 to store data in a nonvolatile manner. In one example, in certain system implementations, at least certain components of storage subsystem 580 can overlap with components of memory subsystem 520. Storage subsystem 580 includes storage device(s) 584, which can be or include any conventional medium for storing large amounts of data in a nonvolatile manner, such as one or more magnetic, solid state, or optical based disks, or a combination. Storage device(s) 584 holds code or instructions and data 586 in a persistent state (i.e., the value is retained despite interruption of power to compute platform 500). A portion of the code or instructions may comprise platform firmware that is executed on processor 510. Storage device(s) 584 can be generically considered to be a "memory," although memory 530 is typically the executing or operating memory to provide instructions to processor 510. Whereas storage device(s) 584 is nonvolatile, memory 530 can include volatile memory (i.e., the value or state of the data is indeterminate if power is interrupted to compute platform 500). In one example, storage subsystem 580 includes controller 582 to interface with storage device(s) 584. In one example controller 582 is a physical part of interface 514 or processor 510 or can include circuits or logic in both processor 510 and interface 514.

Compute platform 500 may include an optional Baseboard Management Controller (BMC) 590 that is configured to effect the operations and logic corresponding to the flowcharts disclosed herein. BMC 590 may include a microcontroller or other type of processing element such as a processor core, engine or micro-engine, that is used to execute instructions to effect functionality performed by the BMC. Optionally, another management component (standalone or comprising embedded logic that is part of another component) may be used.

Power source 502 provides power to the components of compute platform 500. More specifically, power source 502 typically interfaces to one or multiple power supplies 504 in compute platform 500 to provide power to the components of compute platform 500. In one example, power supply 504 includes an AC to DC (alternating current to direct current) adapter to plug into a wall outlet. Such AC power can be renewable energy (e.g., solar power) power source 502. In one example, power source 502 includes a DC power source, such as an external AC to DC converter. In one example, power source 502 can include an internal battery or fuel cell source.

As discussed above, in some embodiment the processors illustrated herein may comprise Other Processing Units (collectively termed XPUs). Examples of XPUs include one or more of Graphic Processor Units (GPUs) or General Purpose GPUs (GP-GPUs), Tensor Processing Units (TPUs), Data Processing Units (DPUs), Infrastructure Processing Units (IPUs), Artificial Intelligence (AI) processors or AI inference units and/or other accelerators, FPGAs and/or other programmable logic (used for compute purposes), etc. While some of the diagrams herein show the use of CPUs, this is merely exemplary and non-limiting. Generally, any type of XPU may be used in place of a CPU in the illustrated embodiments. Moreover, as used in the following claims, the term "processor" is used to generically cover CPUs and various forms of XPUs.

The platform 500 may include logic (including hardware and/or firmware) to perform I/O device virtualization techniques described herein. For example, the platform 500 can include an intermediary to enable a physical I/O device to appear as a virtual I/O device, while also providing a technique for system software to run the native drivers of the physical I/O devices and enable aggregate the virtual devices. The techniques described herein can enable preservation of source information, simplified hardware complexity that translates into area and power savings as well as lower effort and faster time-to-market.

Examples of device virtualization techniques follow:

Example 1: A device includes an interface to couple the device to a fabric, wherein the fabric is to couple a requester with one or more physical I/O devices, and logic to: enter a locked state for the one or more physical I/O devices associated with a virtual I/O device, monitor the interface for requests to the one or more physical I/O devices, in response to a request to a predetermined address of one of the physical I/O devices in the locked state, enter an unlocked state for the physical I/O device, in response to a read request to read an identifier of the physical I/O device, block the read request and provide a response to the read request with a value associated with the virtual I/O device when the physical I/O device is in the locked state, and forward the read request to the physical I/O device when the physical I/O device is in the unlocked state.

Example 2: The device of example 1, wherein: each of the one or more physical I/O devices is to appear as an instance of the virtual I/O device.

Example 3: The device of examples 1 or 2, wherein: the physical I/O device includes a physical PCIe device, the virtual I/O device includes a virtual PCIe device, and the identifier includes a device ID (DID)/vendor ID (VID), class code (CC)/revision ID (RID), or header type of the physical PCIe device.

Example 4: The device of any of examples 1-3, wherein: the request to the predetermined address is a write request to write a value to a read-only register of the physical I/O device.

Example 5: The device of example 4, wherein: the value to be written to the read-only register is based on an identifier of the virtual I/O device, and/or the value is stored in a register of the device and/or based on a value stored in the register of the device.

Example 6: The device of example 5, wherein: the value to be written to the read-only register includes: the inverse of the identifier of the virtual I/O device.

Example 7: The device of any of examples 1-6, wherein: the request to the predetermined address is a request to read or write a predetermined value to an unlock address of the physical I/O device.

Example 8: The device of any of examples 1-7, wherein: the request to the predetermined address is a request in an unlock sequence of requests.

Example 9: The device of any of examples 1-7, wherein: the logic is to: in response to a second request to the predetermined address of the physical I/O device in the unlocked state, re-enter a locked state for the physical I/O device.

Example 10: The device of any of examples 1-9, wherein: the logic is to: in response to a second request to a second predetermined address of the physical I/O device in the unlocked state, re-enter a locked state for the physical I/O device.

Example 11: The device of any of examples 1-10, wherein: the logic is to enter the locked state for the physical I/O device during system boot or when the physical I/O device is added to a system that includes the device.

Example 12: The device of any of examples 1-11, wherein: the logic is to enter the locked state for the device during system boot in response to system firmware setting one or more bits in a register of the device to enable locking the one or more physical I/O devices.

Example 13: The device of any of examples 1-12, wherein: the request to the predetermined address to trigger unlocking the physical I/O device is from a driver for the virtual I/O device.

Example 14: The device of example 13, wherein: the read request to read the identifier is from a driver of the physical I/O device loaded by the driver for the virtual I/O device.

Example 15: The device of any of examples 1-14, wherein: the one or more physical I/O devices include: multiple storage devices associated with the same virtual I/O device, multiple network interface cards (NICs) associated with the same virtual I/O device, or different types of physical I/O devices associated with the same virtual I/O device.

Example 16: The device of example 15, wherein: the multiple storage devices include storage devices from different vendors associated with the same virtual I/O device.

Example 17: A system including a bus to couple one or more physical PCIe devices with a processor, and logic to: determine the one or more physical PCIe devices are assigned to a virtual PCIe device, enter a locked state for the one or more physical PCIe devices, monitor the bus for requests to the one or more physical PCIe devices, in response to a request to a predetermined address of one of the physical PCIe devices in the locked state, enter an unlocked state for the physical PCIe device, in response to a read request to read an identifier of the physical PCIe device when the physical PCIe device is in the locked state, block the read request and provide a response to the read request with a value associated with the virtual PCIe device, and in response to the read request to read the identifier of the physical PCIe device when the physical PCIe device is in the unlocked state, forward the read request to the physical PCIe device.

Example 18: The system of example 17, further including the processor.

Example 19: The system of example 17, wherein the logic is in accordance with the device of any of examples 2-16.

Example 20: A method including: monitoring an interface, by a device, for requests to one or more physical PCIe devices associated with a virtual PCIe device, in response to a request to a predetermined address of one of the physical PCIe devices in a locked state, enter an unlocked state for the physical PCIe device, in response to a read request to read an identifier of the physical PCIe device when the physical PCIe device is in the locked state, block the read request and provide a response to the request with a value for the virtual PCIe device, and in response to the read request to read the identifier of the physical PCIe device when the physical PCIe device is in the unlocked state, forward the read request to the physical PCIe device.

Example 21: The method of example 20, wherein: each of the one or more physical I/O devices is to appear as an instance of the virtual I/O device.

Example 22: The method of examples 20 or 21, wherein: the identifier includes a device ID (DID)/vendor ID (VID), class code (CC)/revision ID, or header type of the physical PCIe device.

Example 23: The method of any of examples 20-22, further including: in response to a second request to the predetermined address of the physical I/O device in the unlocked state, re-entering a locked state for the physical I/O device.

Example 24: The method of any of examples 20-22, further including: in response to a second request to a second predetermined address of the physical I/O device in the unlocked state, re-entering a locked state for the physical I/O device.

Example 25: The method of any of examples 20-24, wherein the device, physical I/O devices, and/or virtual I/O device are in accordance with any of examples 2-16.

Example 26: A non-transitory machine-readable medium having instructions stored thereon configured to be executed on one or more processors to perform a method in accordance with any of examples 20-25.

Example 27: A device or system including: an interface to couple the device to a fabric, wherein the fabric is to couple a requester with one or more physical I/O devices, and means to enter a locked state for the one or more physical I/O devices associated with a virtual I/O device, means to monitor the interface for requests to the one or more physical I/O devices, means to, in response to a request to a predetermined address of one of the physical I/O devices in the locked state, enter an unlocked state for the physical I/O device, means to, in response to a read request to read an identifier of the physical I/O device, block the read request and provide a response to the read request with a value associated with the virtual I/O device when the physical I/O device is in the locked state, and forward the read request to the physical I/O device when the physical I/O device is in the unlocked state.

Example 28: the device or system of example 27, further including: in response to a second request to the predetermined address or a second predetermined address of the physical I/O device in the unlocked state, means to re-enter a locked state for the physical I/O device.

Example 29: A device including: an interface to couple the device to a fabric, wherein the fabric is to couple a requester with one or more physical I/O devices that are associated with a virtual I/O device, and logic to: selectively intercept a read request to read an identifier of one of the physical I/O devices, including to respond to the read request with a value of the identifier associated with the virtual I/O device when the physical I/O device is in a locked state.

Example 30: The device of example 29, wherein: the logic is to: enter a locked state for the one or more physical I/O devices associated with the virtual I/O device, monitor the interface for requests to the one or more physical I/O devices, and in response to a request to a predetermined address of one of the physical I/O devices in the locked state, enter an unlocked state for the physical I/O device, and wherein to selectively intercept the read request, the logic is to: block the read request and provide a response to the read request with the value associated with the virtual I/O device when the physical I/O device is in the locked state, and forward the read request to the physical I/O device when the physical I/O device is in the unlocked state.

Example 31: The device of examples 29 or 30, wherein the logic is in accordance with any of examples 2-16.

Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

To the extent various operations or functions are described herein, they can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

The hardware design embodiments discussed above may be embodied within a semiconductor chip and/or as a description of a circuit design for eventual targeting toward a semiconductor manufacturing process. In the case of the later, such circuit descriptions may take of the form of a (e.g., VHDL or Verilog) register transfer level (RTL) circuit description, a gate level circuit description, a transistor level circuit description or mask description or various combinations thereof. Circuit descriptions are typically embodied on a computer readable storage medium (such as a CD-ROM or other type of storage technology).

Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A device comprising:
   an interface to couple the device to a fabric, wherein the fabric is to couple a requester with one or more physical I/O devices that are associated with a virtual I/O device; and
   logic to: selectively intercept a read request to read an identifier of one of the physical I/O devices, including to respond to the read request with a value of the identifier associated with the virtual I/O device when the physical I/O device is in a locked state.

2. The device of claim 1, wherein:
   the logic is to:
      enter a locked state for the one or more physical I/O devices associated with the virtual I/O device,
      monitor the interface for requests to the one or more physical I/O devices, and
      in response to a request to a predetermined address of one of the physical I/O devices in the locked state, enter an unlocked state for the physical I/O device; and
   wherein to selectively intercept the read request, the logic is to:
      block the read request and provide a response to the read request with the value associated with the virtual I/O device when the physical I/O device is in the locked state, and forward the read request to the physical I/O device when the physical I/O device is in the unlocked state.

3. The device of claim 1, wherein:

each of the one or more physical I/O devices is to appear as an instance of the virtual I/O device.

4. The device of claim 1, wherein:

the physical I/O device includes a physical PCIe device;

the virtual I/O device includes a virtual PCIe device; and the identifier includes a device ID (DID)/vendor ID (VID), class code (CC)/revision ID (RID), or header type of the physical PCIe device.

5. The device of claim 2, wherein:

the request to the predetermined address is a write request to write a value to a read-only register of the physical I/O device.

6. The device of claim 5, wherein:

the value to be written to the read-only register is based on an identifier of the virtual I/O device.

7. The device of claim 5, wherein:

the value to be written to the read-only register includes: an inverse of the identifier of the virtual I/O device.

8. The device of claim 2, wherein:

the request to the predetermined address is a request to read or write a predetermined value to an unlock address of the physical I/O device.

9. The device of claim 2, wherein:

the logic is to:

in response to a second request to the predetermined address of the physical I/O device in the unlocked state, re-enter a locked state for the physical I/O device.

10. The device of claim 2, wherein:

the logic is to:

in response to a second request to a second predetermined address of the physical I/O device in the unlocked state, re-enter a locked state for the physical I/O device.

11. The device of claim 1, wherein:

the logic is to enter the locked state for the physical I/O device during system boot or when the physical I/O device is added to a system that includes the device.

12. The device of claim 1, wherein:

the logic is to enter the locked state for the device during system boot in response to system firmware setting one or more bits in a register of the device to enable locking the one or more physical I/O devices.

13. The device of claim 2, wherein:

the request to the predetermined address to trigger unlocking the physical I/O device is from a driver for the virtual I/O device.

14. The device of claim 13, wherein:

the read request to read the identifier is from a driver of the physical I/O device loaded by the driver for the virtual I/O device.

15. The device of claim 1, wherein:

the one or more physical I/O devices include: multiple storage devices associated with a same virtual I/O device, multiple network interface cards (NICs) associated with the same virtual I/O device, or different types of physical I/O devices associated with the same virtual I/O device.

16. The device of claim 15, wherein:

the multiple storage devices include storage devices from different vendors associated with the same virtual I/O device.

17. A system comprising:

a bus to couple one or more physical PCIe devices with a processor; and logic to:

enter a locked state for the one or more physical PCIe devices assigned to a virtual PCIe device, monitor the bus for requests to the one or more physical PCIe devices, in response to a request to a predetermined address of one of the physical PCIe devices in the locked state, enter an unlocked state for the physical PCIe device, in response to a read request to read an identifier of the physical PCIe device when the physical PCIe device is in the locked state, block the read request and provide a response to the read request with a value associated with the virtual PCIe device, and in response to the read request to read the identifier of the physical PCIe device when the physical PCIe device is in the unlocked state, forward the read request to the physical PCIe device.

18. The system of claim 17, further comprising:

the processor.

19. A non-transitory machine-readable medium having instructions stored thereon configured to be executed on one or more processors to perform a method comprising:

monitoring an interface, by a device, for requests to one or more physical I/O devices associated with a virtual I/O device;

in response to a request to a predetermined address of one of the physical I/O devices in a locked state, enter an unlocked state for the physical I/O device;

in response to a read request to read an identifier of the physical I/O device when the physical I/O device is in the locked state, block the read request and provide a response to the request with a value for the virtual I/O device; and in response to the read request to read the identifier of the physical I/O device when the physical I/O device is in the unlocked state, forward the read request to the physical I/O device.

20. The non-transitory machine-readable medium of claim 19, wherein:

the physical I/O device includes a physical PCIe device;

the virtual I/O device includes a virtual PCIe device; and the identifier includes a device ID (DID)/vendor ID (VID) or class code (CC)/revision ID of the physical PCIe device.

* * * * *